(12) United States Patent
Barnes et al.

(10) Patent No.: US 8,678,116 B2
(45) Date of Patent: Mar. 25, 2014

(54) ACCESSORY DRIVE CONFIGURATION

(75) Inventors: David M. Barnes, Columbus, IN (US);
Kevin Augustin, Sr., Greenwood, IN (US)

(73) Assignee: Cummins Inc., Columbus, IN (US)

( * ) Notice: Subject to any disclaimer, the term of this patent is extended or adjusted under 35 U.S.C. 154(b) by 308 days.

(21) Appl. No.: 13/104,639

(22) Filed: May 10, 2011

(65) Prior Publication Data

US 2012/0167857 A1 Jul. 5, 2012

Related U.S. Application Data

(60) Provisional application No. 61/428,889, filed on Dec. 31, 2010.

(51) Int. Cl.
*F01M 1/02* (2006.01)
*B60W 10/00* (2006.01)

(52) U.S. Cl.
USPC ............... 180/65.265; 123/198 R; 903/930; 903/902; 903/903; 903/905; 903/907; 903/914; 903/946

(58) Field of Classification Search
USPC ............... 123/198 R; 477/5, 6; 180/65.265; 903/930, 902, 903, 905, 907, 914, 946
See application file for complete search history.

(56) References Cited

U.S. PATENT DOCUMENTS

| | | | |
|---|---|---|---|
| 3,104,530 A | 9/1963 | Teichert | |
| 4,129,043 A | 12/1978 | Ishikawa | |
| 4,393,964 A * | 7/1983 | Kemper | 477/6 |
| 4,615,308 A | 10/1986 | Asanomi et al. | |
| 5,154,144 A | 10/1992 | Okui et al. | |
| 5,231,961 A | 8/1993 | Shimada et al. | |
| 5,732,667 A * | 3/1998 | Sakurai | 123/41.44 |
| 6,026,921 A * | 2/2000 | Aoyama et al. | 180/65.25 |
| 6,048,289 A * | 4/2000 | Hattori et al. | 477/15 |
| 6,149,544 A * | 11/2000 | Masberg et al. | 477/13 |
| 6,251,042 B1 * | 6/2001 | Peterson et al. | 477/3 |
| 6,287,081 B1 * | 9/2001 | Tamegai et al. | 417/15 |
| 7,270,097 B2 * | 9/2007 | Purcilly et al. | 123/90.31 |
| 7,282,003 B2 * | 10/2007 | Klemen et al. | 475/5 |
| 7,380,530 B2 * | 6/2008 | Schafer et al. | 123/90.17 |
| 7,391,129 B2 | 6/2008 | Chiao et al. | |
| 7,506,711 B2 | 3/2009 | Usoro | |
| 7,547,264 B2 * | 6/2009 | Usoro | 475/5 |
| 7,650,876 B2 | 1/2010 | Liedtke et al. | |
| 7,748,482 B2 | 7/2010 | Holmes et al. | |
| 7,748,483 B2 * | 7/2010 | Usoro | 180/65.27 |
| 7,827,945 B2 * | 11/2010 | Gregor et al. | 123/90.15 |
| 7,972,235 B2 * | 7/2011 | Usoro et al. | 475/5 |

(Continued)

FOREIGN PATENT DOCUMENTS

| | | | | |
|---|---|---|---|---|
| EP | 0 401 710 | 12/1993 | | |
| JP | 63263136 A * | 10/1988 | | B60K 17/10 |

(Continued)

*Primary Examiner* — Lindsay Low
*Assistant Examiner* — Tea Holbrook
(74) *Attorney, Agent, or Firm* — Krieg DeVault LLP

(57) ABSTRACT

An apparatus for an accessory drive configuration includes an internal combustion engine having a crankshaft which is structured to provide traction power. A torque-transmitting shaft extends through a portion of an internal combustion engine assembly, and the torque-transmitting shaft provides mechanical power to an accessory drive system. The internal combustion engine and an electric motor are operably coupled to the torque-transmitting shaft to selectively provide torque to the torque-transmitting shaft.

25 Claims, 5 Drawing Sheets

(56) References Cited

U.S. PATENT DOCUMENTS

| | | | |
|---|---|---|---|
| 8,225,762 B2* | 7/2012 | Lancefield et al. | 123/90.17 |
| 8,375,903 B2* | 2/2013 | Dopona et al. | 123/90.14 |
| 8,376,070 B2* | 2/2013 | Waszak et al. | 180/65.265 |
| 2003/0116368 A1* | 6/2003 | Winkelman et al. | 180/65.2 |
| 2005/0072255 A1* | 4/2005 | McCrary et al. | 74/330 |
| 2006/0025260 A1 | 2/2006 | Klemen et al. | |
| 2006/0113129 A1* | 6/2006 | Tabata | 180/65.2 |
| 2006/0213706 A1* | 9/2006 | Gouda et al. | 180/65.4 |
| 2007/0142152 A1* | 6/2007 | Holmes et al. | 475/2 |
| 2008/0179119 A1* | 7/2008 | Grenn et al. | 180/65.2 |
| 2009/0107739 A1* | 4/2009 | Major et al. | 180/53.8 |
| 2010/0057281 A1* | 3/2010 | Lawyer et al. | 701/22 |
| 2010/0219007 A1* | 9/2010 | Dalum et al. | 180/65.22 |
| 2011/0061954 A1* | 3/2011 | Singh et al. | 180/65.22 |
| 2011/0065543 A1* | 3/2011 | Usoro | 475/5 |
| 2011/0120788 A1* | 5/2011 | Wang et al. | 180/65.23 |
| 2011/0167811 A1* | 7/2011 | Kawaguchi et al. | 60/395 |
| 2011/0246005 A1* | 10/2011 | King et al. | 701/22 |
| 2012/0225751 A1* | 9/2012 | Andreae et al. | 477/5 |
| 2012/0266701 A1* | 10/2012 | Yamada et al. | 74/15.82 |

FOREIGN PATENT DOCUMENTS

| | | | | |
|---|---|---|---|---|
| JP | 2002078101 A | * | 3/2002 | B60L 1/00 |
| WO | 03/038309 | | 5/2003 | |
| WO | 2008/113186 | | 9/2008 | |

* cited by examiner

ACCESSORY DRIVE CONFIGURATION

RELATED APPLICATIONS

This application is related, and claims the benefit of, U.S. Provisional Patent Application 61/428,889 filed on Dec. 31, 2010, which is incorporated herein by reference for all purposes.

BACKGROUND

Hybrid power applications include multiple sources for providing working power. Internal combustion engines have historically driven related power accessories. An internal combustion engine in a hybrid power application may experience start/stop cycles where the engine is not available as an accessory power source during certain operating conditions. Applications including a dedicated accessory drive system add packaging bulk and expense to the hybrid power application. Therefore, further technological developments are desirable in this area.

SUMMARY

One embodiment is a unique accessory drive configuration. Other embodiments include unique methods, systems, and apparatus to provide an accessory drive configuration capable of powering accessories when an engine is in an off state. Further embodiments, forms, objects, features, advantages, aspects, and benefits shall become apparent from the following description and drawings.

DESCRIPTION OF THE ILLUSTRATIVE EMBODIMENTS

Figure 1:
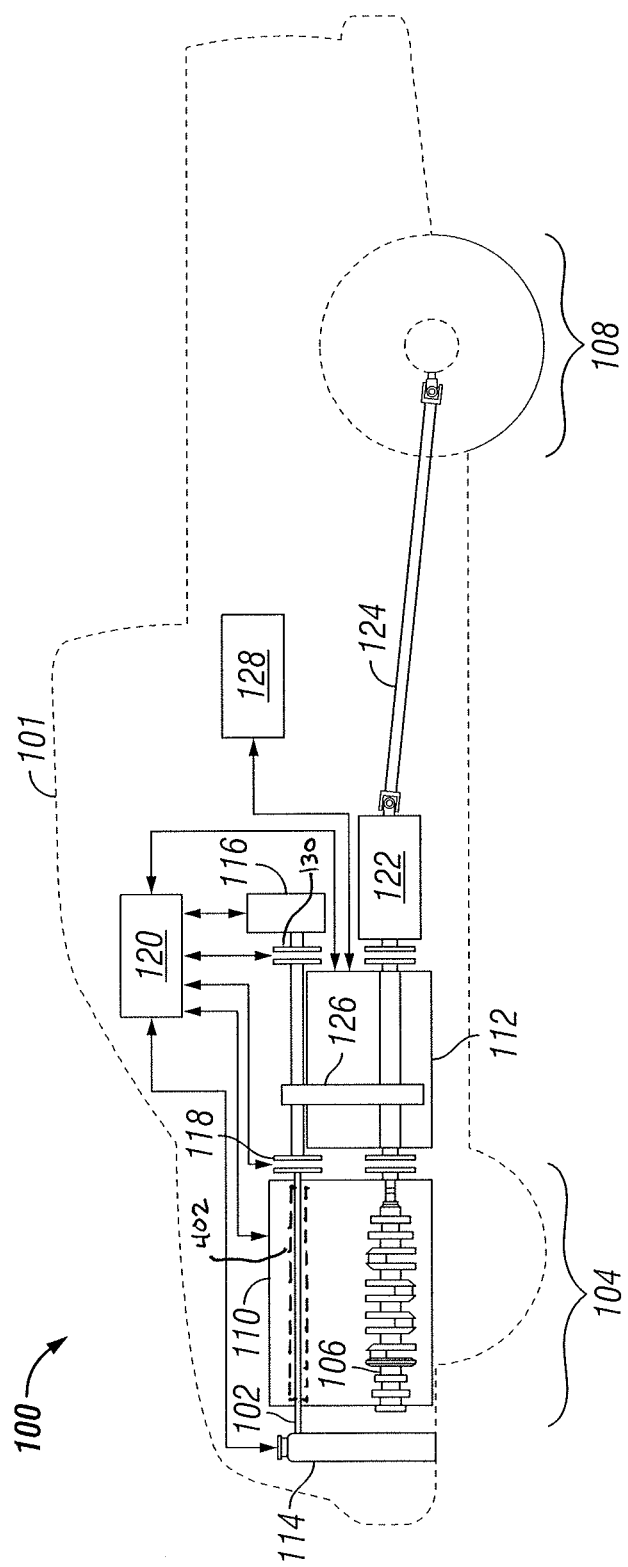
FIG. 1 is a schematic block diagram for an accessory drive configuration.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

FIG. 1 is a schematic block diagram for an accessory drive configuration. A vehicle 101 has a torque-transmitting shaft 102 passing through an internal combustion engine assembly 104. The internal combustion engine assembly 104 includes an internal combustion engine 110, where the torque of the internal combustion engine 110 is transferred from a crankshaft 106 to a load 108. An exemplary load 108 is shown in FIG. 1 as driving the rear wheels of the vehicle 101. It is also contemplated that the load 108 may be a generator, a pump, a propeller, and/or any other load 108 which may be powered by internal combustion engine 110. The torque from the crankshaft 106 is transferred, for example, through a transmission 122 and a driveshaft 124 to drive the vehicle wheels.

An electric motor 112 may be selectively coupled to the drivetrain to allow the load 108 to be powered by the internal combustion engine 110, the electric motor 112, or a combination thereof. In one example, the electric motor 112 is a traction motor providing power to vehicle wheels or other motive devices, and/or the electric motor 112 is a motor/generator. The system 100 includes an electrical energy storage device 128 electrically coupled to the motor/generator 112 to store electrical energy generated by the motor/generator 112 when the motor generator 112 is functioning as a generator, and to provide electrical energy to the motor/generator 112 when the motor/generator 112 is functioning as a motor.

An accessory drive system 114 is coupled to the torque-transmitting shaft 102. Torque is selectively provided to the torque-transmitting shaft by the internal combustion engine 110 and the electric motor 112. The torque-transmitting shaft 102 may receive torque from the electric motor 112 through a power take off 126, and/or by gears 126 mechanically coupling the electric motor 112 to the shaft 102. A clutch 118 may be utilized to select the source of torque for the torque-transmitting shaft 102. The clutch 118 in a first position mechanically couples the engine 110 to the shaft 102, and in a second position mechanically couples the electric motor 112 to the shaft 102. Additional or alternative mechanical engagement devices may be provided in place of the clutch 118.

The torque transferred to the torque-transmitting shaft 102 mechanically powers the accessory drive system 114. A rear accessory drive system 116 may be mechanically driven by the internal combustion engine 110 and/or the electric motor 112 by receiving torque through the torque-transmitting shaft 102. In certain embodiments, the rear accessory drive system 116 may be powered by the electric motor 112 when a rear clutch 130 is engaged, and the rear accessory drive system 116 may be powered by the engine 110 and/or another device when the rear clutch 130 is disengaged. An additional clutch (not shown) may engage the engine 110, a transmission 122 power take-off, or other device to the rear accessory drive system 116 when the electric motor 112 is not powering the rear accessory drive system 116.

In certain embodiments, the system 100 further includes a controller 120 structured to perform certain operations to control the accessory drive configuration. In certain embodiments, the controller 120 forms a portion of a processing subsystem including one or more computing devices having memory, processing, and communication hardware. The controller 120 may be a single device or a distributed device, and the functions of the controller 120 may be performed by hardware or software.

Figure 2:
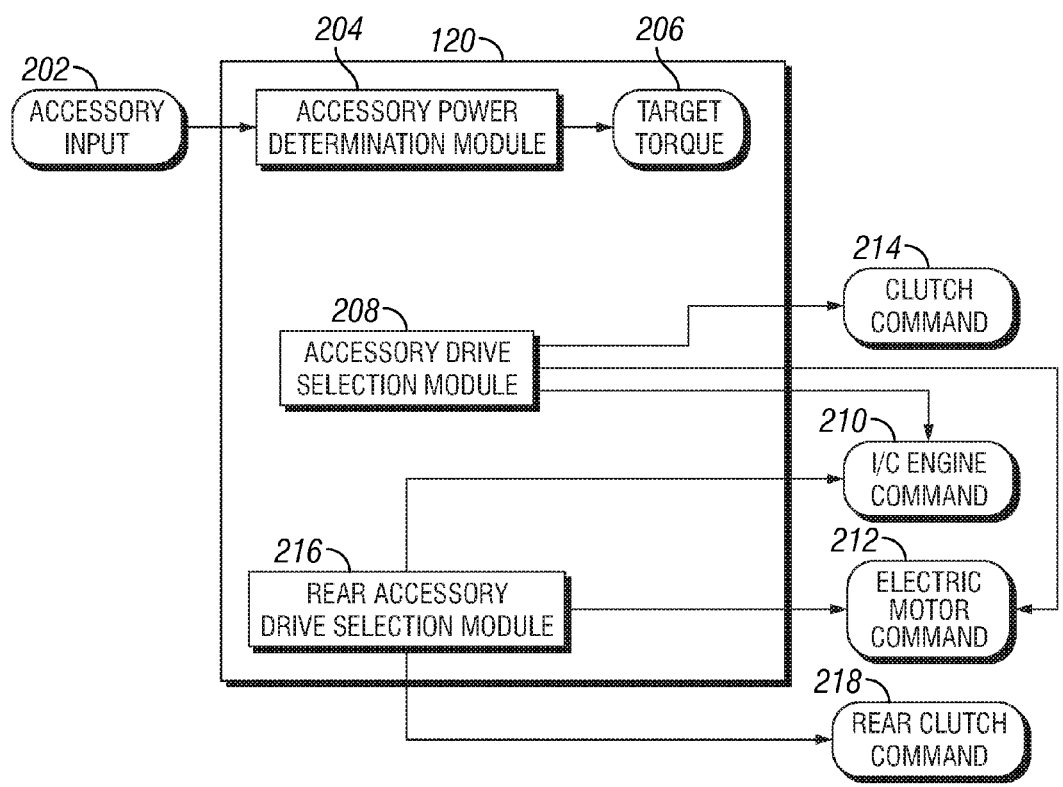
FIG. 2 is a schematic view of a controller that functionally executes certain operations for the accessory drive configuration.

Referencing FIG. 2, certain embodiments of the controller 120 include one or more modules structured to functionally execute the operations of the controller 120. In certain embodiments, the controller 120 includes an accessory drive selection module 208, an accessory power determination module 204, and/or a rear accessory drive selection module 216. An exemplary accessory drive selection module 208 determines a torque source for the accessory drive system 114. An exemplary accessory power determination module 204 determines a target torque 206 for driving the accessory drive system 114. An exemplary rear accessory drive selection module determines a torque source for the rear accessory drive system 116.

The description herein including modules emphasizes the structural independence of the aspects of the controller 120, and illustrates one grouping of operations and responsibilities of the controller 120. Other groupings that execute similar overall operations are understood within the scope of the present application. Modules may be implemented in hardware and/or software on computer readable medium, and modules may be distributed across various hardware or software components. More specific descriptions of certain embodiments of controller 120 operations are described following.

Certain operations described herein include interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

FIG. 2 is a schematic view of the controller 120 that functionally executes certain operations for the accessory drive configuration. The exemplary controller 120 includes an accessory power determination module 204, an accessory drive selection module 208, and a rear accessory drive selection module 216. Specific embodiments of the controller 120 may omit certain modules or have additional modules, as will be understood by the description herein and the claims following. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

In one embodiment of the present invention, the accessory power determination module 204 receives an accessory input 202. Exemplary accessory inputs 202 include a value indicating that accessories are presently operating, a list of accessories that are presently operating, a total torque required (or estimated) to operate the presently operating accessories, and/or any other input from the accessory drive system and/or individual accessories to determine power requirements and/or operational statuses. In certain embodiments, the accessory input 202 may be derived from other engine parameters including coolant temperature (e.g. indicating that a water pump is operating), radiator temperature (e.g. indicating that a fan is operating at a particular RPM), a cabin temperature/ambient temperature comparison (e.g. indicating that either air conditioning and/or a heating system is being operated) and/or any other engine parameter which may be correlated to an accessory input 202.

The accessory power determination module 204 determines the target torque 206. The target torque 206 may be a minimum torque to power the accessory drive system 114. The accessory power determination module 204 may determine the minimum torque requirement of the accessory drive system 114 through a look-up-table containing various accessories and the respective torque requirements, utilize a fixed accessory drive system 114 speed at which the accessories are adequately powered, or may incorporate feedback mechanisms into some or all of the accessories which provide a minimum torque requirement based on the current demand of the accessories. It is contemplated that adequately powering the accessory drive system 114 includes providing any amount of torque to the accessory drive system which activates at least one accessory.

The target torque 206 is selected to achieve the torque requirements for the operating accessories, and/or is a value determined in response to the torque requirements for the operating accessories. Exemplary and non-limiting target torque 206 values include: a closest value to the minimum torque requirement which is achievable by the system 100; a current torque being supplied from the electric motor 112 or internal combustion engine 110 to the accessory drive system 114; a torque value equal to the closest one of the current torque being supplied from the electric motor 112 or the internal combustion engine 110; a torque value determined according to a torque requirement for each individual accessory, according to an on/off state for each accessory and/or a current torque requirement for each accessory. The current torque requirement for each accessory may be provided by a lookup table based on certain operating parameters (e.g. current accessory rotating speed), according to default values for one or more accessories that are presently active, and/or according to a model of torque requirements for one or more accessories and current operating conditions of the system.

The accessory drive selection module 208 achieves the target torque 206 by selectively connecting the internal combustion engine 110 and/or the electric motor 112 to the accessory drive system 114 (the torque is transferred from the internal combustion engine 110 and the electric motor 112 to the accessory drive system 114 through the torque-transmitting shaft 102). The accessory drive selection module 208 may communicate to a clutch 118 or multiple clutches through a clutch command 214 to select the source and amount of torque to be transferred to the accessory drive system 114.

In certain embodiments, the accessory drive selection module selects the internal combustion engine by providing an internal combustion (I/C) engine command 210. The I/C engine command 210 includes a selection of the engine as the accessory power source, and/or includes an amount of torque to be transferred from the engine to the accessories. An exemplary system includes a clutch responsive to the I/C engine command 210 to operatively couple the engine to the shaft driving the accessory drive assembly. Another exemplary system includes a variable torque device, for example and without limitation slipping clutch, that transfers a selectable amount of torque from the engine to the accessories in response to the I/C engine command 210.

In certain embodiments, the accessory drive selection module selects the electric motor by providing an electric motor command 212. The electric motor command 212 includes a selection of the electric motor as the accessory power source, and/or includes an amount of torque to be transferred from the electric motor to the accessories. An exemplary system includes a clutch responsive to the electric motor command 212 to operatively couple the engine to the shaft driving the accessory drive assembly. Another exemplary system includes a variable torque device, for example and without limitation slipping clutch, that transfers a selectable amount of torque from the engine to the accessories in response to the electric motor command 212.

An exemplary controller 120 includes the rear accessory drive selection module 216 will providing an I/C engine command 210 and/or an electric motor command 212 to select the power source of the rear accessory drive system 116. A rear clutch command 218 may activate a single clutch 130 or multiple clutches to determine the source and amount of power to be transferred to the rear accessory drive system 116. It is also contemplated that a target torque 206 may be determined for the rear accessory drive system. The target torque 206 for the rear accessory drive system 116 can be achieved through the use of the rear clutch command 218 and/or through the I/C engine command 210 and the electric motor command 212.

Figure 3:
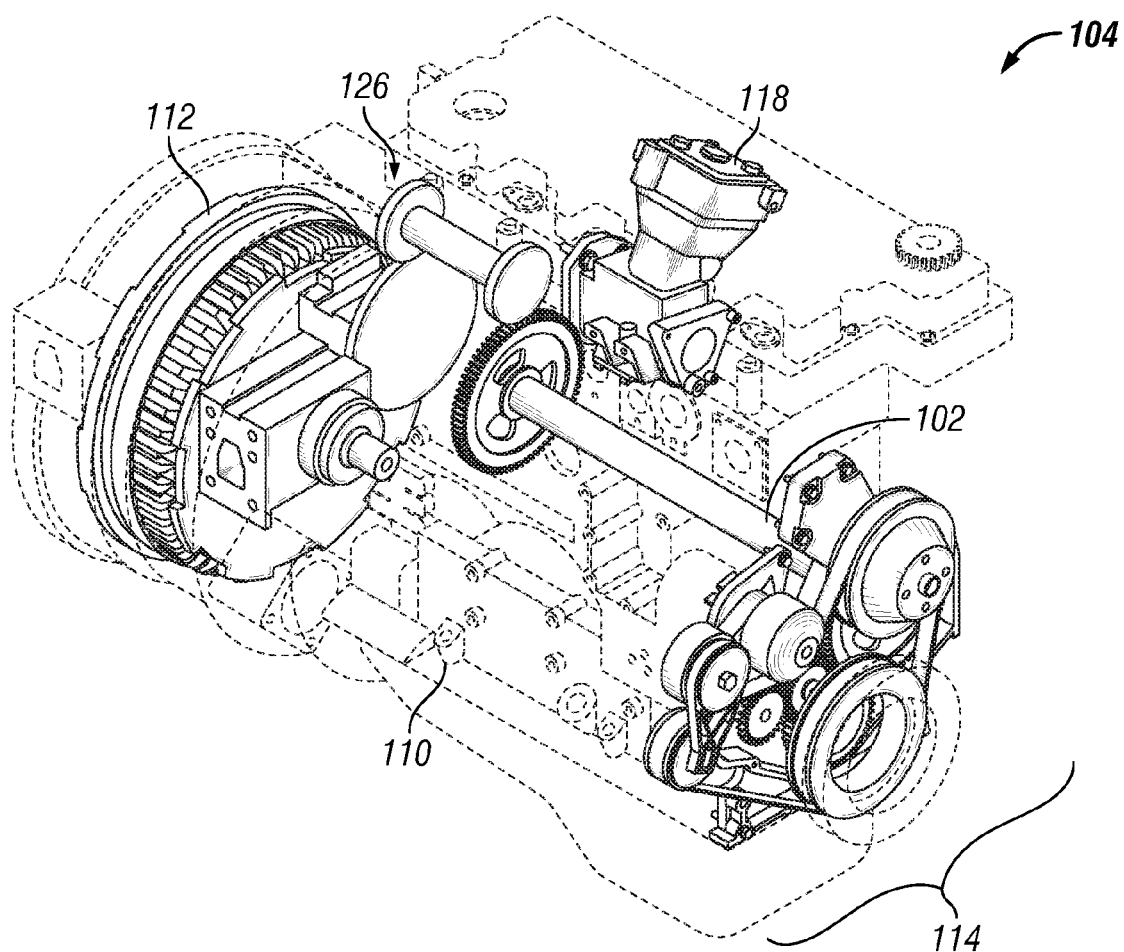
FIG. 3 is a cut away view of an accessory drive configuration.

FIG. 3 is a cut away view of an accessory drive configuration. In one form of the present invention, a torque-transmitting shaft 102 extends through a portion of an internal combustion engine assembly 104.

An exemplary and non-limiting description of the engine assembly 104 includes a region around the engine that is generally under the control of an engine manufacturer—for example the region near the engine wherein the engine manufacturer installs devices without interference with an original equipment manufacturer (OEM) device, and/or a region near the engine that is within the cross-sectional footprint of the engine and associated devices (e.g. valves, filters, wiring, hoses, turbocharger, fluid plumbing and/or other engine associated devices). A region that is within the cross-sectional footprint is any region wherein the shaft 102 does not protrude from the greatest extent in a given direction of the system including the engine and the associated devices.

Additionally or alternatively, the engine assembly 104 includes the engine block 406 and cylinder head 408. Yet another exemplary description of the engine assembly 104 includes the external associated devices to the engine, includes at least valves, filters, wiring, hoses, turbocharger, and/or fluid plumbing.

The torque-transmitting shaft 102 can be any type of shaft capable of transmitting torque from the electric motor 112 and the internal combustion engine 110 to power the accessory drive system 114. In an exemplary embodiment, the electric motor 112 is a motor/generator. It is also contemplated that the electric motor 112 may be an asynchronous motor/generator, an induction motor, a synchronous motor/generator, or any type of motor capable of powering the accessory drive system 114. In certain embodiments, the electric motor 112 applications may be a traction motor capable of providing power to the drivetrain of the vehicle 101.

Referring back to FIG. 1, in certain embodiments the electric motor 112 is electrically connected to an electrical energy storage device 128. The electrical energy storage device 128 may be a nickel metal hydride battery, a lithium ion battery, and/or a fuel cell. In certain embodiments, energy may be stored non-electrically, for example in a high performance flywheel, in a compressed air tank, and/or through deflection of a high capacity spring. Where the energy is stored electrically, any electrical energy storage device 128 is contemplated herein, including a lead-acid battery, a cadmium battery, a hyper-capacitor, and/or an ultra-capacitor. As shown in FIG. 1, the internal combustion engine 110, the electric motor 112, and the electrical energy storage device 128 may be configured as a series hybrid; however, any hybrid configuration (e.g. parallel and/or series-parallel) or non-hybrid configuration is also contemplated herein.

Referring back to FIG. 3, the gears 126 are a power take off from the electric motor 112 to the shaft 102. However, the power take off may also be belt driven, chain driven, shaft driven, or can be configured in any manner to provide the torque-transmitting shaft 102 with power from the electric motor 112. In an exemplary embodiment, the internal combustion engine 110 is a diesel engine. However, it is contemplated that the internal combustion engine 110 is a gasoline engine, a natural gas engine, a rotary engine, or any other internal combustion engine known to one of ordinary skill.

A clutch or series of clutches may be utilized to transfer torque from the electric motor 112, to transfer torque from the internal combustion engine 110, or to allow the accessory drive system 114 to remain unpowered. The clutch 118 may be a simple on/off type clutch, the clutch 118 may transfer variable discrete torque, and/or the clutch 118 may transfer continuously variable torque to the torque-transmitting shaft 102. It is contemplated that the clutch 118 may be any clutch and/or transmission known to one of skill in the art.

The torque-transmitting shaft 102 may transfer torque to the accessory drive system 114 through the use of belts, chains, gears, and/or any other method of transferring torque from the torque-transmitting shaft 102 to the accessory drive system 114. The accessory drive system 114 may include at least one accessory. In an exemplary embodiment, the accessory is one of a pump, a fan, and a compressor. In some embodiments, the accessory drive system 114 may include an engine coolant pump, an air pump, a HVAC refrigerant compressor, a cooling fan, an alternator, and other accessories capable of being included into a front end accessory drive (FEAD) as are commonly used in automotive and industrial machinery applications.

Referring back to FIG. 1, the rear accessory drive system 116 may include such at least one accessory. In an exemplary embodiment, the accessory is one of an air compressor, a refrigeration compressor, and a pump. In some embodiments the rear accessory drive system 116 may include accessories such as refrigeration compressors (e.g. to cool a refrigeration trailer), dual tank air compressors (e.g. to be utilized for air brakes), single tank air compressors, hydraulic and pneumatic pumps, a water pump (e.g. in a pump truck application) and any other accessories known to one of skill in the art that may be included in a rear accessory drive system 116.

In one embodiment of the present invention, torque from the internal combustion engine 110, torque from the electric motor 112, or torque from both the internal combustion engine 110 and the electric motor 112 may be transferred to power the rear accessory drive system 116. Torque may be transferred through the torque-transmitting shaft 102 to the rear accessory drive system 116. As with the accessory drive system 114, the selection of the power source for the rear accessory drive system 116 may include at least one clutch. In other embodiments, a mechanical linkage, independent of the torque-transmitting shaft 102, may be utilized to transmit torque from the electric motor 112 or the internal combustion engine 110. In certain embodiments, the electric motor 112 is the sole source of torque for the rear accessory drive system 116.

In a further embodiment, the internal combustion engine 110 is the sole source of torque for the rear accessory drive system 116. A power take off, such as a gearing, may be utilized to direct a portion of torque from the internal combustion engine 110 to the rear accessory drive system 116. The rear accessory drive system 116 may accept a gear torque input, or any other type of torque input including a belt, chain, or other torque device.

Figure 4:
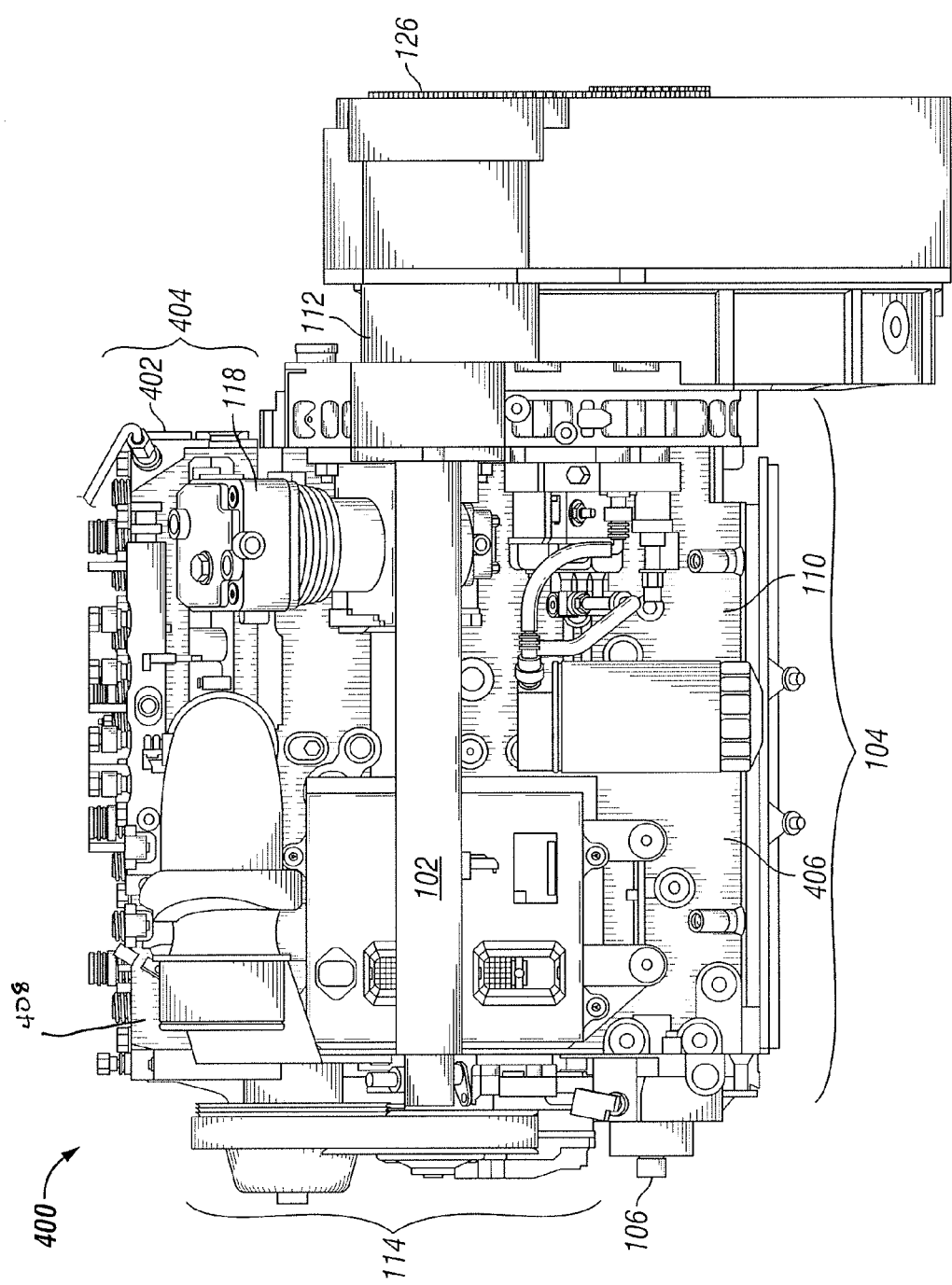
FIG. 4 is a cut away view of an accessory drive configuration.

FIG. 4 is a cut away view of an accessory drive configuration 400. The configuration 400 shown in FIG. 4 includes an accessory drive system 114 mechanically driven by a torque-transmitting shaft 102. A clutch 118 is utilized to selectively provide torque from the electric motor 112 and the internal combustion engine 110. A power take off 126 to transfer torque from the electric motor 112 to the torque-transmitting shaft 102 is partially shown. Crankshaft 106 provides power to a load (e.g. providing traction power to a vehicle). Included in the internal combustion engine assembly 104 are the engine block 406, the upper engine assembly 404 including the cylinder head, and a camshaft 402, as well as other parts of an internal combustion engine assembly 104 known to one of ordinary skill in the art. The configuration 400 includes the torque-transmitting shaft 102 passing through the engine assembly 104 external to the engine block 406.

Certain alternate or additional accessory drive configurations are described. In certain embodiments, the shaft 102 passes through the engine assembly 104 through the engine block, for example via a through-block cam bore (e.g. reference FIG. 3). A through block cam bore includes any aperture in an engine block sized to receive a camshaft. In certain embodiments, an engine assembly 104 is constructed to accept an overhead cam and/or a through-block cam. The torque-transmitting shaft 102 may extend through the engine assembly 104 by being positioned through the through-block cam bore. In certain embodiments, the torque-transmitting shaft 102 passes through camshaft 402 which has been bored to allow the extension of the torque-transmitting shaft 102 to pass therethrough, such as shown in FIG. 1. In certain embodiments, the torque-transmitting shaft 102 passes through the engine assembly 104 concentrically with camshaft 102, either a through-block camshaft or an overhead camshaft.

Figure 5:
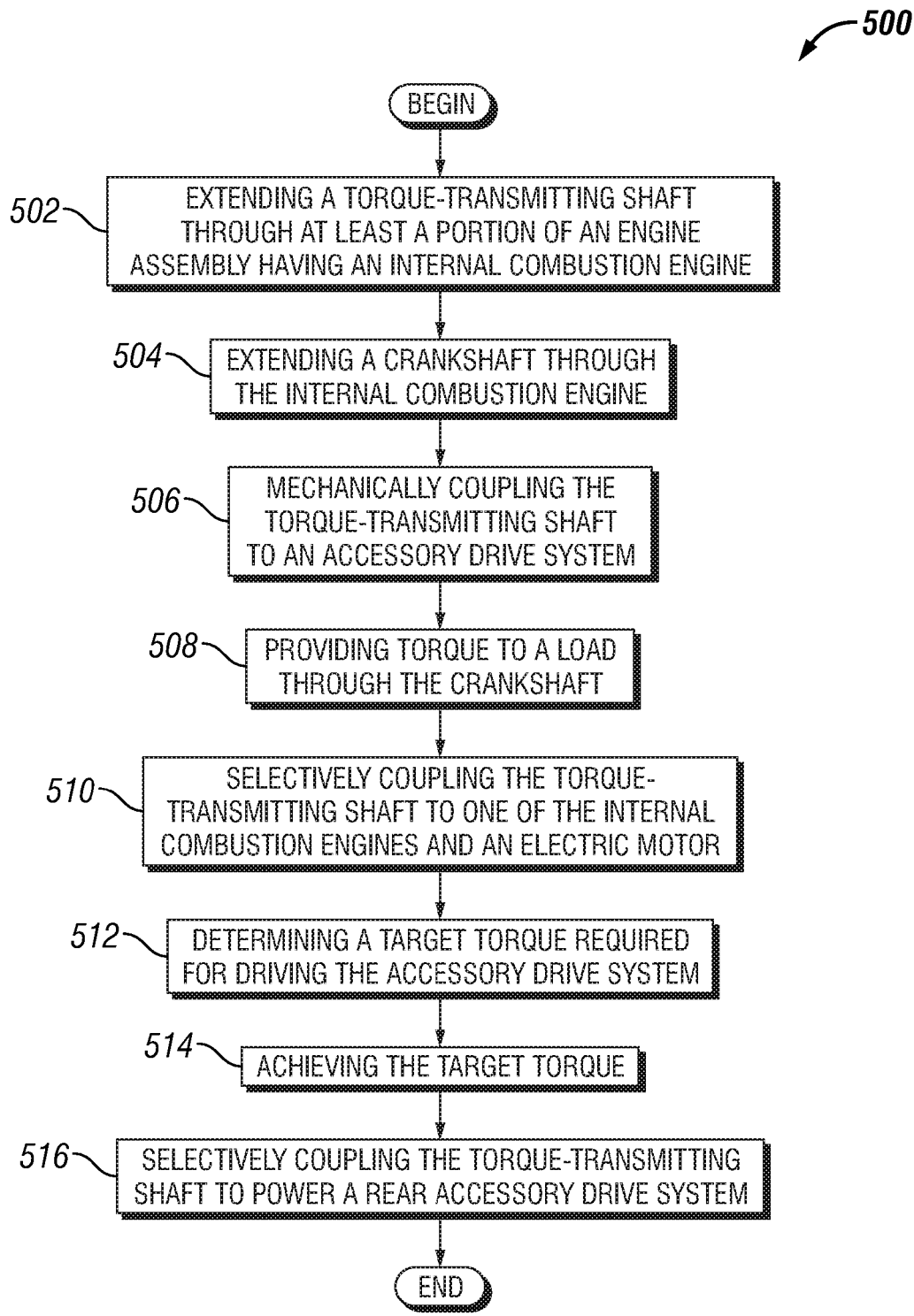
FIG. 5 is a schematic flow diagram of an accessory drive configuration.

FIG. 5 is a schematic flow diagram of an accessory drive configuration. The procedure 500 begins with an operation 502 extending a torque-transmitting shaft through at least a portion of an engine assembly having an internal combustion engine. An operation 504 extends a crankshaft through the internal combustion engine. An operation 506 mechanically couples the torque-transmitting shaft to an accessory drive system. An operation 508 provides torque to a load through the crankshaft. An operation 510 selectively couples the torque-transmitting shaft to one of the internal combustion engine and an electric motor. An operation 512 determines a target torque required for driving the accessory drive system. In response to the operation 512 determining a target torque, an operation 514 achieves the target torque. An operation 516 selectively couples the torque-transmitting shaft to power a rear accessory drive system. The aforementioned procedure 500 is merely one embodiment of the present invention; however, it is contemplated that operations may be added, removed, or reordered as is known to one of ordinary skill.

As is evident from the figures and text presented above, a variety of embodiments according to the present invention are contemplated. An exemplary set of embodiments is a system including a torque-transmitting shaft extending through at least a portion of an internal combustion engine assembly, wherein the internal combustion engine assembly includes a crankshaft mechanically coupled to a load. A controller includes an accessory drive selection module structured to select one of an electric motor and an internal combustion engine as a torque-transmitting shaft power source. The system further includes an accessory drive system mechanically powered by the torque-transmitting shaft.

An exemplary system includes wherein the at least a portion of the internal combustion engine assembly includes one of an engine block and a cylinder head. In certain embodiments, the internal combustion engine is a diesel engine having at least one overhead camshaft. In further embodiments, the torque-transmitting shaft extends through at least a portion of a through block cam bore. In certain embodiments, the torque-transmitting shaft extends coaxially with a camshaft, the camshaft and the torque-transmitting shaft are structured for independent rotation. In certain embodiments, the accessory drive system includes at least one accessory selected from the group of accessories consisting of: a pump, a fan, and a compressor.

In certain embodiments, a rear accessory drive system is selectively coupled to the internal combustion engine and the electric motor and the controller further comprising a rear accessory drive selection module structured to select a rear accessory power source, the rear accessory power source comprising at least one of the internal combustion engine and the electric motor. In further embodiments, the rear accessory drive system includes at least one accessory selected from the group of accessories consisting of: an air compressor, a refrigeration compressor, and a pump.

In certain embodiments, the electric motor is a traction motor/generator electrically coupled to an electrical energy storage device selected from the group of electrical energy storage devices consisting of: a nickel metal hydride battery, a lithium ion battery, and a fuel cell. In further embodiments, the traction motor/generator, the internal combustion engine, and the electrical energy storage device are operably coupled in a series hybrid configuration. In certain embodiments, the controller further comprises an accessory power determination module structured to determine a target torque for driving the accessory drive system, wherein the accessory drive selection module is further structured to select the torque-transmitting shaft power source in response to the target torque.

Another exemplary set of embodiments is an apparatus including an internal combustion engine having a crankshaft structured to provide traction power. The apparatus further includes a torque-transmitting shaft extending through a portion of an internal combustion engine assembly, the torque-transmitting shaft providing mechanical power to an accessory drive system. The apparatus further includes the internal combustion engine and an electric motor are operably coupled to the torque-transmitting shaft to selectively provide torque to the torque-transmitting shaft. In further embodiments, the portion of the internal combustion engine assembly is external to the engine block.

In certain embodiments, an accessory power determination module is structured to determine a target torque for driving the accessory drive system. In further embodiments, an accessory drive selection module is structured to select one of the internal combustion engine and the electric motor to provide torque to the torque transmitting shaft in response to the target torque. In certain embodiments, the internal combustion engine is a diesel engine having at least one overhead camshaft and wherein the torque-transmitting shaft extends through a through block cam bore. In certain embodiments, a rear accessory drive system is operably coupled to the internal combustion engine, the internal combustion engine providing power to the rear accessory drive system.

In certain embodiments, the apparatus further includes a clutch interposed between the internal combustion engine and the electric motor. In further embodiments, the accessory drive selection module is further structured to select the one of the internal combustion engine and the electric motor by providing a clutch command. In yet further embodiments, the clutch is responsive to the clutch command.

Yet another exemplary set of embodiments is a system, including an internal combustion engine having a crankshaft, the crankshaft structured to provide traction power. The system further includes means for selecting between the internal combustion engine and an electric motor to provide torque to an accessory drive system. The system further includes means for transferring torque from the internal combustion engine and the electric motor to the accessory drive system.

In certain embodiments, the system includes means for powering a rear accessory drive system. In certain embodiments, the system includes means for determining a target torque required to drive the accessory drive system. In a further embodiment, the system includes means for providing a torque to the accessory drive system in response to the target torque.

Yet another exemplary set of embodiments is a method, including extending a torque-transmitting shaft through at least a portion of an engine assembly, the engine assembly including an internal combustion engine. The method further includes extending a crankshaft through the internal combustion engine. The method further includes mechanically coupling the torque-transmitting shaft to an accessory drive system. The method further includes providing torque to a load through the crankshaft. The method further includes selectively coupling the torque-transmitting shaft to one of the internal combustion engine and an electric motor.

In certain embodiments, the method includes selectively coupling the torque-transmitting shaft to one of the internal combustion engine and the electric motor is further performed in response to determining a target torque required for driving the accessory drive system. In certain embodiments, the method includes selectively coupling the torque-transmitting shaft to power a rear accessory drive system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   a torque-transmitting shaft extending through at least a portion of an internal combustion engine assembly, wherein the internal combustion engine assembly includes a crankshaft mechanically coupled to a load;
   a controller including an accessory drive selection module structured to select one of an electric motor and an internal combustion engine as a torque-transmitting shaft power source; and
   an accessory drive system and a rear accessory drive system coupled to opposite ends of the torque-transmitting shaft that are each mechanically powered by the torque-transmitting shaft power source through the torque-transmitting shaft.

2. The system of claim 1, wherein the at least a portion of the internal combustion engine assembly comprises one of an engine block and a cylinder head.

3. The system of claim 1, wherein the internal combustion engine is a diesel engine having at least one overhead camshaft.

4. The system of claim 3, wherein the torque-transmitting shaft extends through at least a portion of a through block cam bore.

5. The system of claim 1, wherein the torque-transmitting shaft extends coaxially with a camshaft through the at least a portion of the internal combustion engine assembly, wherein the camshaft and the torque-transmitting shaft are structured for independent rotation.

6. The system of claim 1, wherein the accessory drive system includes at least one accessory selected from the group of accessories consisting of: a pump, a fan, and a compressor.

7. The system of claim 1, wherein the controller further comprises a rear accessory drive selection module structured to select a rear accessory power source, the rear accessory power source comprising at least one of the internal combustion engine and the electric motor.

8. The system of claim 7, wherein the rear accessory drive system includes at least one accessory selected from the group of accessories consisting of: an air compressor, a refrigeration compressor, and a pump.

9. The system of claim 1, wherein the electric motor is a traction motor/generator electrically coupled to an electrical energy storage device selected from the group of electrical energy storage devices consisting of: a nickel metal hydride battery, a lithium ion battery, and a fuel cell.

10. The system of claim 9, wherein the traction motor/generator, the internal combustion engine, and the electrical energy storage device are operably coupled in a series hybrid configuration.

11. The system of claim 1, wherein the controller further comprises an accessory power determination module structured to determine a target torque for driving the accessory drive system, wherein the accessory drive selection module is further structured to select the torque-transmitting shaft power source in response to the target torque.

12. An apparatus, comprising:
    an internal combustion engine having a crankshaft structured to provide traction power;
    a torque-transmitting shaft extending through a portion of an internal combustion engine assembly, the torque-transmitting shaft providing mechanical power to each of an accessory drive system and a rear accessory drive system coupled to opposite ends of the torque-transmitting shaft; and
    wherein the internal combustion engine and an electric motor are selectively coupled to the torque-transmitting shaft to provide torque to the torque-transmitting shaft.

13. The apparatus of claim 12, wherein the portion of the internal combustion engine assembly is external to an engine block.

14. The apparatus of claim 12, further comprising:
    an accessory power determination module structured to determine a target torque for driving the accessory drive system; and
    an accessory drive selection module structured to select one of the internal combustion engine and the electric motor to provide torque to the torque-transmitting shaft in response to the target torque.

15. The apparatus of claim 14, further comprising a clutch interposed between the internal combustion engine and the electric motor;
    wherein the accessory drive selection module is further structured to select the one of the internal combustion engine and the electric motor by providing a clutch command; and
    wherein the clutch is responsive to the clutch command.

16. The apparatus of claim 14, wherein the accessory drive selection module is further structured to select the internal combustion engine by providing an internal combustion engine command.

17. The apparatus of claim 14, wherein the accessory drive selection module is further structured to select the electric motor by providing an electric motor command.

18. The apparatus of claim 12, wherein the internal combustion engine is a diesel engine having at least one overhead camshaft and wherein the torque-transmitting shaft extends through the at least one overhead camshaft.

19. The apparatus of claim 12, wherein the rear accessory drive system is operably coupled to the internal combustion engine, the internal combustion engine providing power to the rear accessory drive system.

20. A system, comprising:
- an internal combustion engine having a crankshaft, the crankshaft structured to provide traction power, the internal combustion engine further including a camshaft extending through the internal combustion engine;
- means for selecting between the internal combustion engine and an electric motor to provide torque to an accessory drive system;
- means for transferring torque from the internal combustion engine and the electric motor to the accessory drive system, wherein the means for transferring torque includes a torque-transmitting shaft extending through a bore of the camshaft, and the torque-transmitting shaft is rotatable independently of the camshaft to power the accessory drive system.

21. The system of claim 20, further comprising means for powering a rear accessory drive system.

22. The system of claim 20, further comprising: means for determining a target torque required to drive the accessory drive system; and
- means for providing torque to the accessory drive system in response to the target torque.

23. A method, comprising:
- extending a torque-transmitting shaft through a camshaft of an internal combustion engine of an engine assembly;
- extending a crankshaft through the internal combustion engine;
- mechanically coupling the torque-transmitting shaft to an accessory drive system;
- providing torque to a load through the crankshaft; and
- selectively coupling the torque-transmitting shaft to one of the internal combustion engine and an electric motor to power the torque-transmitting shaft independently of the cam shaft.

24. The method of claim 23, wherein the selectively coupling the torque-transmitting shaft to one of the internal combustion engine and the electric motor is further performed in response to determining a target torque required for driving the accessory drive system.

25. The method of claim 23, further comprising selectively coupling the torque-transmitting shaft to power a rear accessory drive system.

\* \* \* \* \*